(12) United States Patent
West

(10) Patent No.: US 9,228,496 B2
(45) Date of Patent: Jan. 5, 2016

(54) BLEED AIR DUCT JOINT INSULATION MEANS

(75) Inventor: Nicholas West, Berkeley (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 439 days.

(21) Appl. No.: 13/611,875

(22) Filed: Sep. 12, 2012

(65) Prior Publication Data

US 2013/0067882 A1    Mar. 21, 2013

(30) Foreign Application Priority Data

Sep. 21, 2011 (GB) .................................. 1116337.5

(51) Int. Cl.
| | |
|---|---|
| *F02C 6/08* | (2006.01) |
| *F02C 9/18* | (2006.01) |
| *F04D 27/02* | (2006.01) |
| *F16K 15/02* | (2006.01) |
| *F16K 15/06* | (2006.01) |
| *B64D 15/04* | (2006.01) |
| *F16K 17/04* | (2006.01) |
| *F04B 39/10* | (2006.01) |

(52) U.S. Cl.
CPC ... *F02C 6/08* (2013.01); *F02C 9/18* (2013.01); *F04D 27/0215* (2013.01); *B64D 15/04* (2013.01); *F04B 39/102* (2013.01); *F04D 27/0207* (2013.01); *F05D 2260/80* (2013.01); *F16K 15/026* (2013.01); *F16K 15/063* (2013.01); *F16K 17/0413* (2013.01)

(58) Field of Classification Search
CPC .......... F02C 6/08; F02C 9/18; F04D 27/0207; F04D 27/0215; F04B 39/102; F04B 39/1013; F16K 17/0413; F16K 15/026; F16K 15/063; B64D 15/04; B64D 2013/0618
USPC ............... 60/782, 785, 795, 39.091; 244/131; 137/516.11, 535, 540
See application file for complete search history.

(56) References Cited

U.S. PATENT DOCUMENTS

| | | | | |
|---|---|---|---|---|
| 4,674,714 | A * | 6/1987 | Cole et al. | 244/134 B |
| 2010/0158068 | A1* | 6/2010 | Monteiro | 374/4 |

FOREIGN PATENT DOCUMENTS

| | | |
|---|---|---|
| EP | 1 602 910 A1 | 12/2005 |
| GB | 2 226 417 A | 6/1990 |

OTHER PUBLICATIONS

UK Search Report for Application No. 1116337.5 mailed Dec. 15, 2011.

* cited by examiner

*Primary Examiner* — Gerald L Sung
*Assistant Examiner* — Scott Walthour
(74) *Attorney, Agent, or Firm* — Hauptman Ham, LLP

(57) ABSTRACT

A bleed air duct joint insulation means is disclosed in which a leak vent comprises valve means.

7 Claims, 5 Drawing Sheets

US 9,228,496 B2

BLEED AIR DUCT JOINT INSULATION MEANS

RELATED APPLICATIONS

The present application is based on, and claims priority from, Great Britain Application Number 1116337.5, filed Sep. 21, 2011, the disclosure of which is hereby incorporated by reference herein in its entirety.

FIELD OF INVENTION

The present invention relates to bleed air duct joint insulation means.

BACKGROUND OF THE INVENTION

Aircraft powered by jet engines commonly comprise bleed air systems that extract hot pressurised air from the engines for use in various functions around the aircraft such as de-icing systems, cabin pressurisation systems or various pneumatically actuated systems. The bleed air is usually both high temperature and high pressure and as a result requires careful management so as to avoid the associated hazards. Bleed air systems thus comprise one or more safety systems arranged, for example, to detect leakage of the bleed air. Such leakage represents a serious operational issue and generally requires immediate shutdown of the bleed air system and rectification prior to significant further operation of the aircraft. Therefore, it is important for safety systems that detect leakage of bleed air are accurate and robust.

SUMMARY OF THE INVENTION

An embodiment of the invention provides a bleed air duct joint insulation means for use with an overheat detection system, the bleed air duct joint insulation means comprising:

an insulation jacket arranged to encapsulate a bleed air duct joint;

vent means for providing fluid communication between the interior and the exterior of the insulation jacket;

valve means located in the vent means, the valve means being arranged so as to enable fluid flow from the interior to the exterior of the insulation jacket when the fluid pressure in the interior exceeds a predetermined positive pressure threshold.

The valve means may comprise a pressure holding valve. The vent means may be arranged adjacent a sensor for an overheat detection system. The predetermined positive pressure threshold may represent a bleed air leakage rate of 10 g/s. The vent means may comprise diffuser means for diffusing the fluid flow from the vent means.

The valve means may comprise a first body section and a second body section each defining one or more conduits providing fluid communication through the valve means and arranged to capture a valve member and biasing means, the valve member being biased by the biasing means into a first position in which fluid communication through the valve means is prevented and moveable in response to the fluid pressure from the interior of the insulation jacket exceeding the threshold into a second position in which fluid communication through the valve means to the exterior is enabled. The valve means may be fixed to the insulation jacket by the capture of the periphery of the vent means between the first and second body sections.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
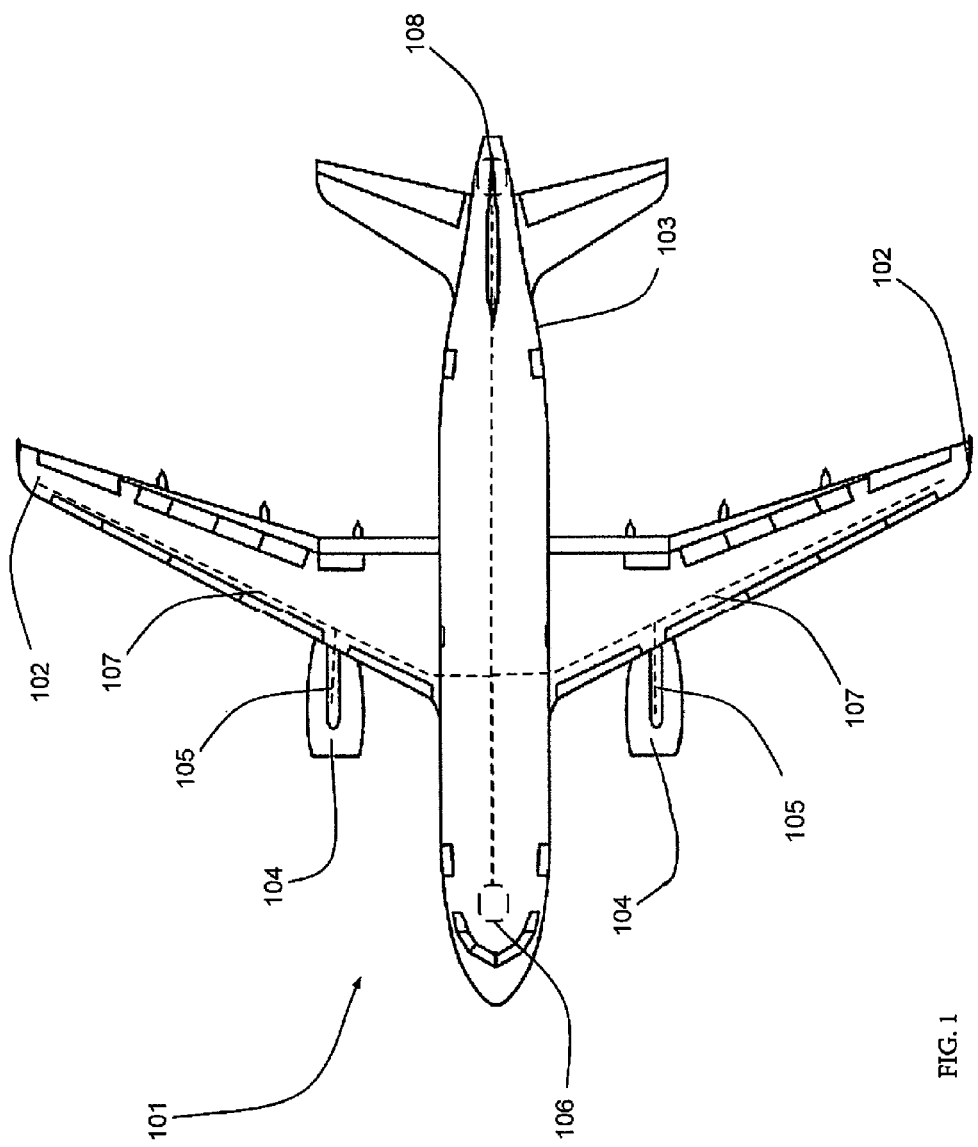
FIG. 1 is a schematic illustration of an aircraft.

With reference to FIG. 1, an aircraft 101 comprises a pair of wings 102 each faired into a fuselage 103. Each of the wings supports an engine 104. Each engine 104 comprises a bleed air supply 105 arranged to provide heated pressurized air to aircraft systems such as leading edge de-icing systems for the wings 102, cabin pressurisation systems or pneumatic actuation systems. The bleed air supply 105 is controlled by a controller 106 and is transported around the aircraft via ducts 107. The bleed air supply 105 is also connected to the auxiliary power unit (APU) 108 located in the aft section of the fuselage 103.

Figure 2:
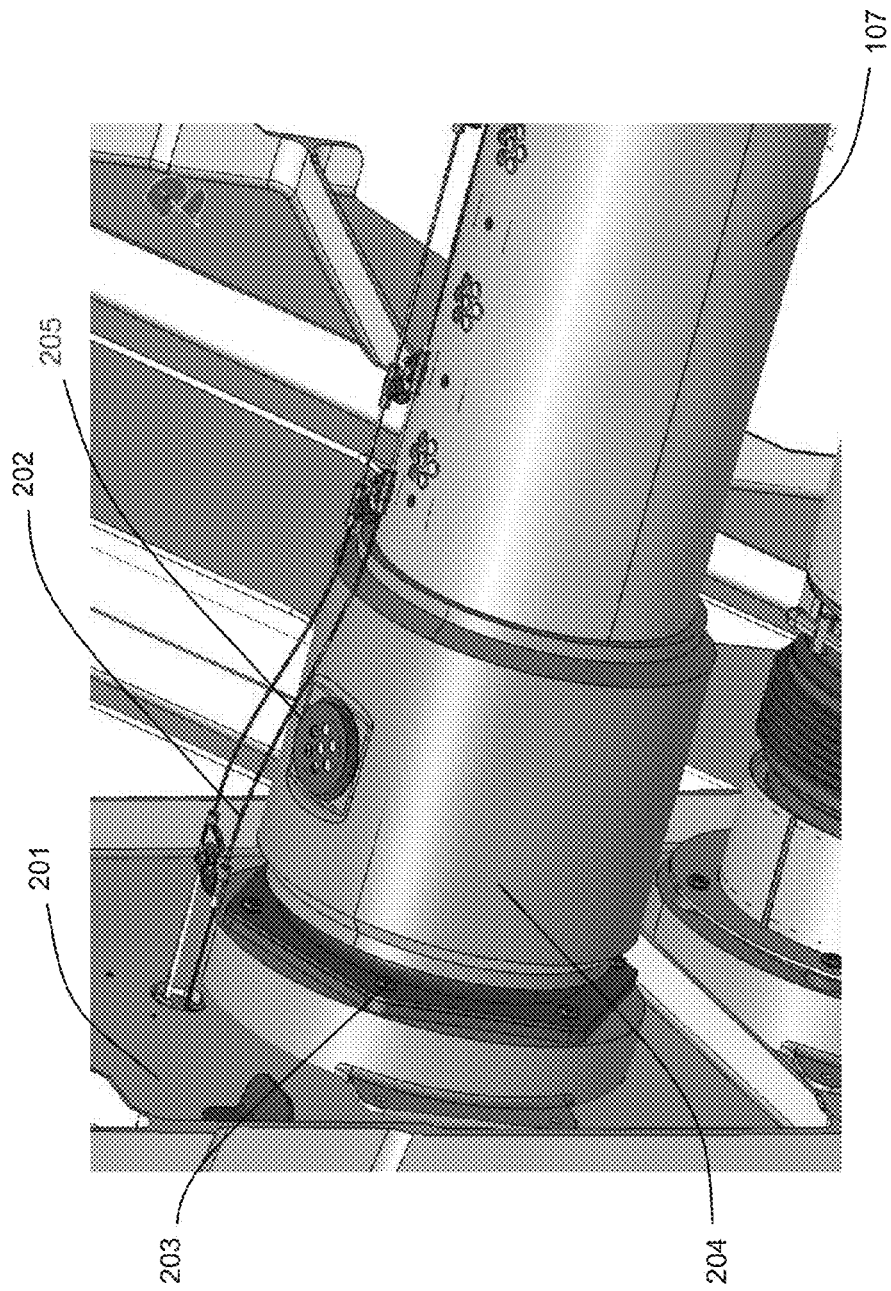
FIG. 2 is a schematic illustration of a bleed air supply duct in the aircraft of FIG. 1.

With reference to FIG. 2, the ducts 107 are supported by and fixed to the aircraft structure 201. The controller 106 comprises an overheat detection system that comprises a set of sensors in the form of overheat detection wires 202. The overheat detection wires 202 are mounted along the ducts 107 and arranged to detect the ambient temperature of the space adjacent the ducts 107. If this ambient temperature exceeds a predetermined threshold, the overheat detection system is arranged to shut down the bleed air system and issue an alarm signal.

The ducts 107 are provided with insulation along their length to insulate their surroundings from the high temperature bleed air. The ducts 107 are constructed in lengths connected by joints 203. The joints 203 are each fitted with an insulation jacket 204 arranged to encapsulate a respective joint 203. Each insulation jacket 204 is provided with a vent 205 arranged adjacent to the overheat detection wires 202 when the insulation jacket 204 is fitted to the respective joint 203.

Figure 3:
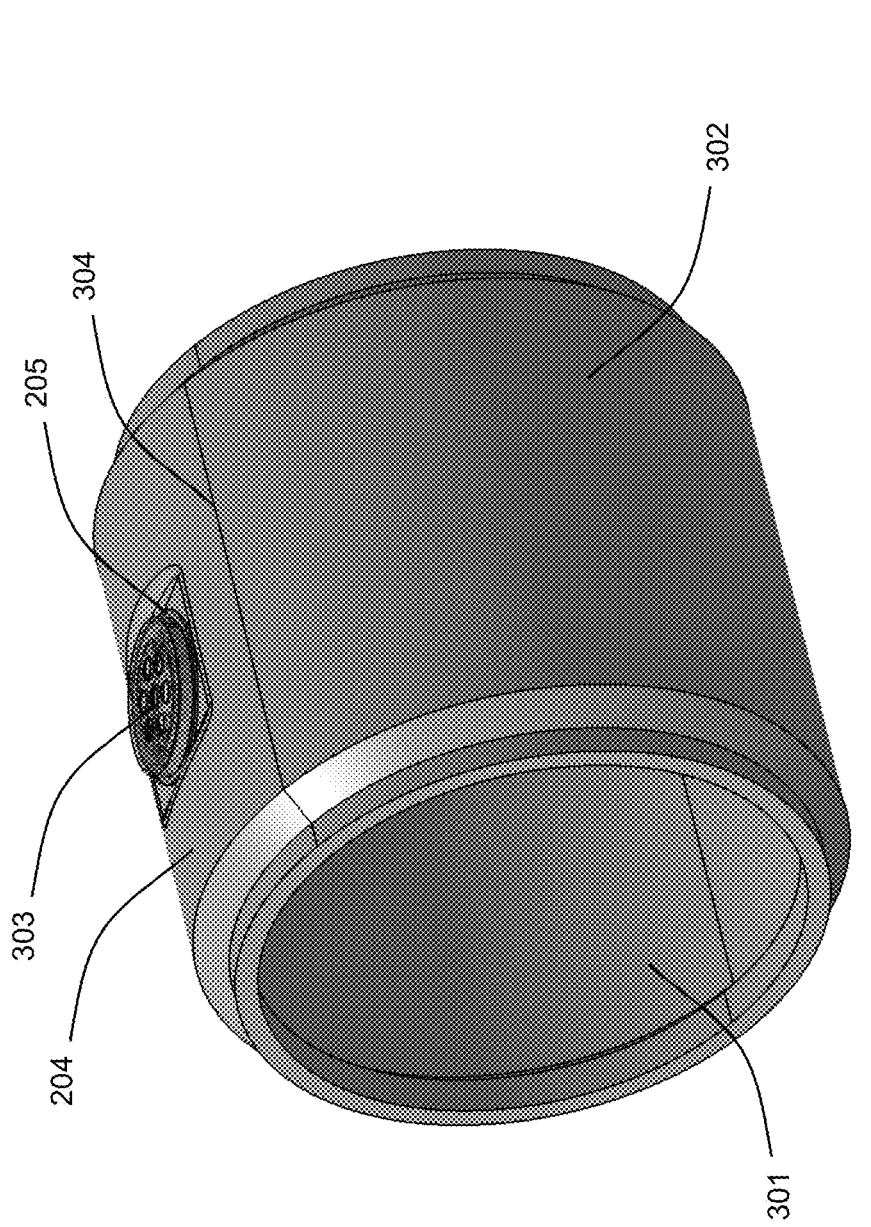
FIG. 3 is a schematic illustration of a bleed air duct joint insulation means for the duct of FIG. 2.

With reference to FIG. 3, the vent 205 is arranged to provide fluid communication between the interior 301 of the insulation jacket 204 surrounding the joint 203 and its exterior 302. In the present embodiment, the vent 205 is provided with valve means 303 in the form of a pressure holding valve (PHV). In the present embodiment, the valve means 303 is arranged to allow fluid communication through the vent 205 once the internal pressure in the insulation jacket exceeds a predetermined positive pressure threshold. In the present embodiment, the predetermined positive pressure threshold is the internal pressure generated within the insulation jacket 204 when the bleed air leakage rate from the respective encapsulated duct joint 203 exceeds 10 g/s.

In the present embodiment, the insulation jacket 204 comprises an axial split 304 so as to facilitate its fitting around the duct joint 203. The insulation jacket 204 is then fixed around the duct joint 203 by circular tapes (not shown) so as to substantially seal the insulated jacket 204 around the joint 203. The axial split 304 is sealed with tape (not shown). In the present embodiment, the fixing method is arranged to allow an airflow rate of up to approximately 10 g/s from the joints of the insulation jacket 204.

Figure 4:
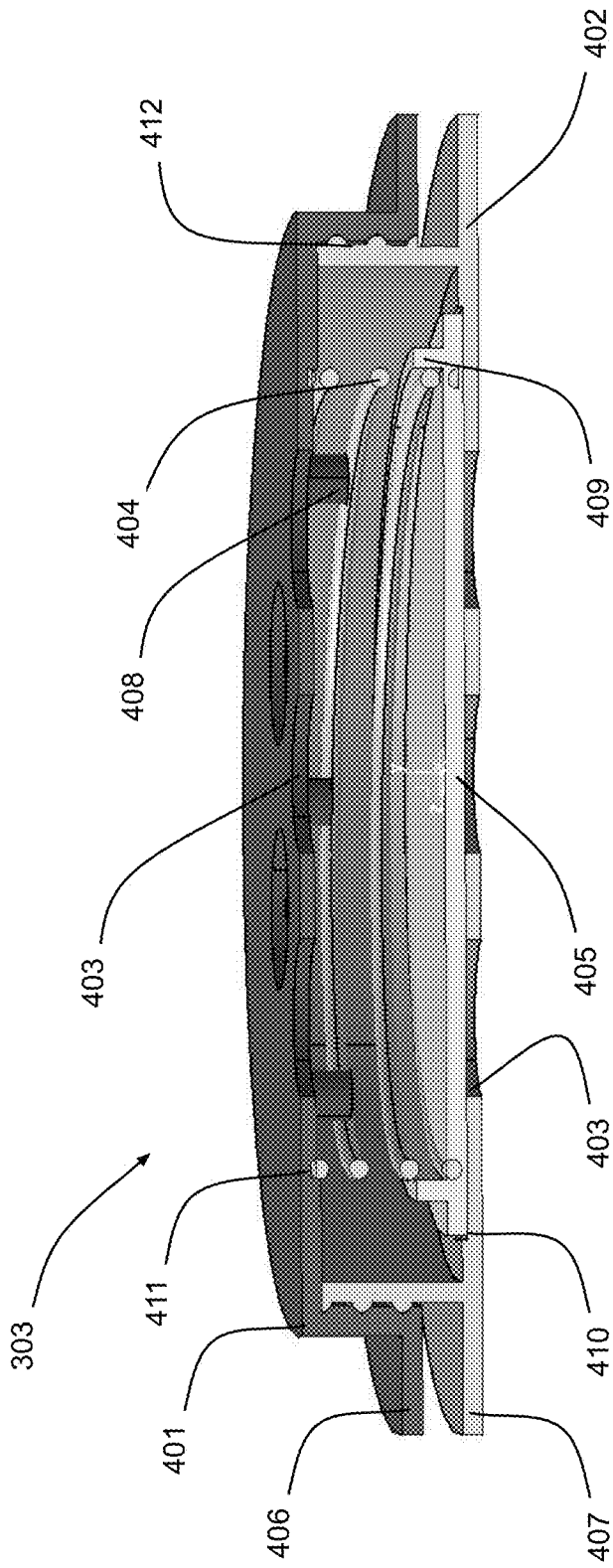
FIG. 4 is a schematic cross section of valve means for the insulation means of FIG. 3.

With reference to FIG. 4, the valve means 303 comprises an upper part 401 and a lower part 402 each comprising a set of holes 403 that enable fluid communication through the valve means 303. The holes 403 in the upper part 401 are arranged as a diffuser so as to diffuse the fluid flow from the vent 205. The upper and lower parts 401, 402 together define an internal void arranged to capture biasing means 404 in the form of a helical spring and a valve member 405 in the form of a diaphragm. The spring 404 is arranged to bias the diaphragm 405 against the holes 403 in the lower part 402 so as to close the valve means 303. The biasing force provided by the spring 404 is selected to determine the required pressure threshold at which the valve means 303 is pushed away from the holes 403 in the lower part 402 so as to open the valve means 303 and enable fluid flow through the vent 205. Limiter means 408 are provided in the form of downward projections from inner surface of the upper part 401. The limiter means 408 are arranged to limit or define uppermost position of the diaphragm 405 so as to prevent the holes 403 in the upper part 401 from being obscured. In other words, the limiter means 408 are arranged to ensure that airflow is always possible through the valve means 303. The diaphragm 405 is provided with a locating flange 409 on its inner surface for relative location of the diaphragm 405 and spring 404. The inner surface of the lower part 401 is provided with a valve seat 410 for locating diaphragm 405 relative to the lower part 402. The inner surface of the upper part 401 is provided with a spring seat 411 for locating the spring 404 relative to the upper part 401. In the present embodiment, the mating surfaces of the upper and lower parts 401, 402 are provided with complementary threaded surfaces 412 for fixing the upper and lower parts 401, 402 together.

Figure 5:
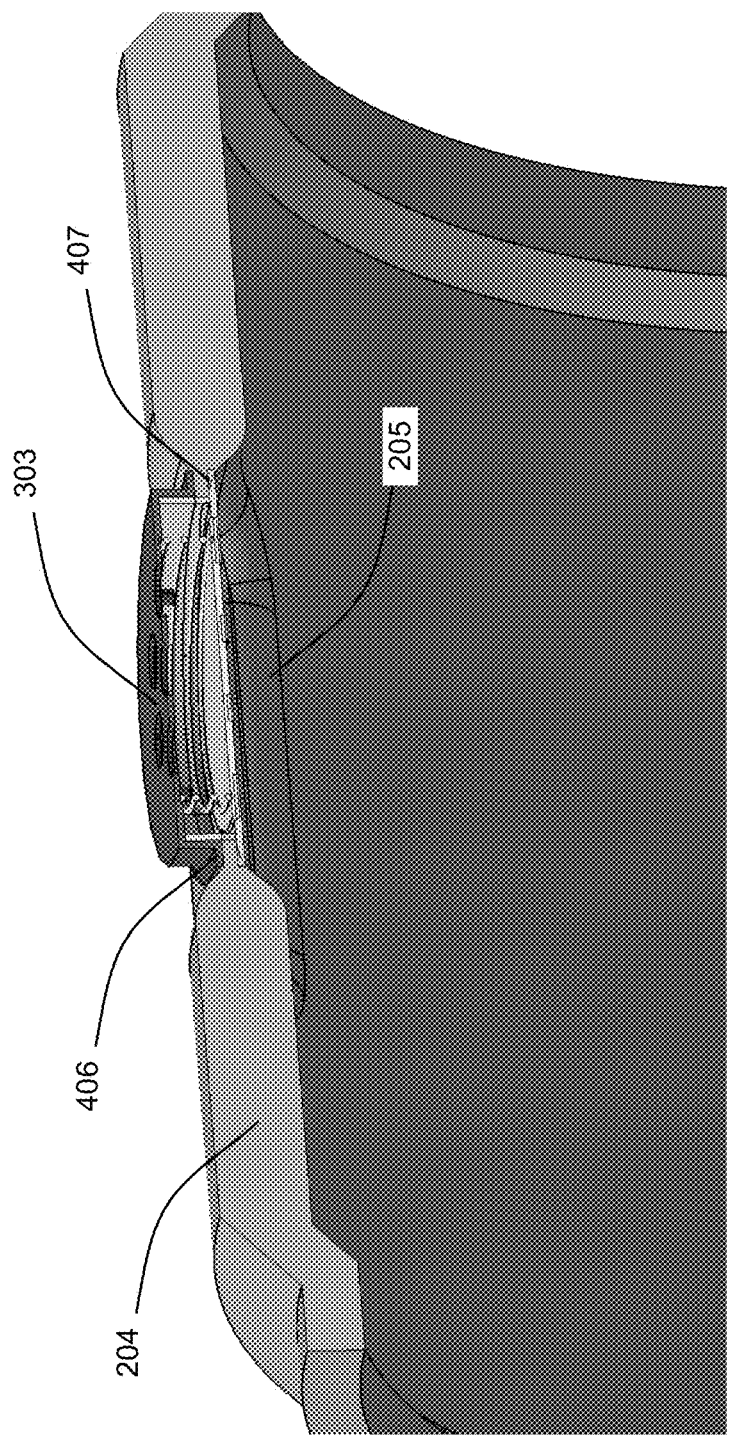
FIG. 5 is a schematic cross section of insulation means of FIG. 3.

The upper and lower parts 401, 402 of the valve means 303 each comprise corresponding circumferential flanges 406, 407 arranged to be spaced apart when the upper and lower parts 401, 402 are fixed together. With reference to FIG. 5, the space between the flanges 406, 407 is arranged to capture the edges of the insulation jacket 204 around the vent 205 so as to sealingly clamp the valve means 303 within the insulation jacket 204.

As will be understood by those skilled in the art, any suitable construction may be used for the valve means so as to provide a suitable pressure or flow rate threshold. As will be understood by those skilled in the art, the diffuser function may be omitted or may be provided by any other suitable means. For example, the upper part of the valve means may be formed with any suitable alternative diffuser arrangement or an additional diffuser element may be added.

As will be understood by those skilled in the art, the upper and lower parts may be fixed together by any other suitable means such as snap-fit, bonding or separate fixing means such as a clip or clamp.

Embodiments of the invention enable control of the leakage flow rate adjacent an overheat detection system sensor within the bleed air system at the duct joint locations. The diaphragm within the valve opens at a predetermined spring rate, allowing the leakage flow through the valve and directing it to potentially trigger a shutdown via the overheat detection system. This arrangement prevents the shut down of the bleed air system at leakage rates of less than 10 g/s. This reduces the number of false or unconfirmed over heat events and thus improves aircraft operation and reliability.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

The invention claimed is:

1. A bleed air duct for use with an overheat detection system, said bleed air duct comprising:
   an insulation jacket arranged to encapsulate a bleed air duct joint;
   a vent for providing fluid communication between an interior and an exterior of said insulation jacket;
   a valve located in said vent, said valve comprises a body section defining one or more conduits providing fluid communication through said valve, a valve member and a biasing member disposed sequentially within said body section with respect to a flow direction through said one or more conduits, said valve being arranged so as to enable fluid flow from said interior to said exterior of said insulation jacket when fluid pressure in said interior exceeds a predetermined positive pressure threshold.

2. A bleed air duct according to claim 1 in which said valve comprises a pressure holding valve.

3. A bleed air duct according to claim 1 in which said vent is arranged adjacent a sensor for the overheat detection system.

4. A bleed air duct according to claim 1 in which said predetermined positive pressure threshold represents a bleed air leakage rate of 10 g/s.

5. A bleed air duct according to claim 1 in which said vent further comprises a diffuser for diffusing fluid flow from said vent.

6. A bleed air duct according to claim 1, wherein said body section comprises a first body section and a second body section, wherein said valve member is biased by said biasing member into a first position in which fluid flow through said valve is prevented and said valve member is moveable in response to said fluid pressure from said interior of said insulation jacket exceeding said predetermined positive threshold into a second position in which fluid flows through said valve to said exterior.

7. A bleed air duct according to claim 6 in which said valve is fixed to said insulation jacket by capture of a periphery of said vent between said first and second body sections.

\* \* \* \* \*